United States Patent
Croxford (10) Patent No.: US 7,694,099 B2
(45) Date of Patent: Apr. 6, 2010

(54) MEMORY CONTROLLER HAVING AN INTERFACE FOR PROVIDING A CONNECTION TO A PLURALITY OF MEMORY DEVICES

(76) Inventor: Daren Croxford, 2 Station Gate, Burwell (GB) CB5 0BZ ( * ) Notice: Subject to any disclaimer, the term of this patent is extended or adjusted under 35 U.S.C. 154(b) by 519 days.

(21) Appl. No.: 11/653,429

(22) Filed: Jan. 16, 2007

(65) Prior Publication Data

US 2008/0172515 A1    Jul. 17, 2008

(51) Int. Cl.
*G06F 13/00* (2006.01)
(52) U.S. Cl. ............... 711/168; 710/100; 719/312; 711/169
(58) Field of Classification Search ............ 711/167
See application file for complete search history.

(56) References Cited

U.S. PATENT DOCUMENTS

| | | | | |
|---|---|---|---|---|
| 5,857,087 A | * | 1/1999 | Bemanian et al. | 710/305 |
| 5,860,106 A | * | 1/1999 | Domen et al. | 713/324 |
| 6,728,803 B1 | * | 4/2004 | Nelson et al. | 710/60 |
| 2005/0138276 A1 | * | 6/2005 | Navada et al. | 711/105 |
| 2007/0028031 A1 | * | 2/2007 | Peterson et al. | 711/103 |

* cited by examiner

*Primary Examiner*—Hetul Patel (57) ABSTRACT

A memory controller with an interface for providing a connection to a plurality of memory devices at least one of said plurality of memory devices supporting burst mode data transfers comprises data interface circuitry for connecting to a plurality of separate data buses for communicating data signals between said memory controller and a respective one of said memory devices, each of said data buses providing a dedicated data signal path to a different one of said memory devices, address interface circuitry for connecting to a common address bus for communicating address signals to each of said memory devices on a shared address signal path, address signals which are directed to different ones of said memory devices being time division multiplexed together on said common address bus, and device selecting circuitry for generating one or more device selecting signals synchronised with said time division multiplexing of said common address bus to select that memory device to which address signals currently asserted on said common address bus are directed. In this way, an increased bandwidth memory controller can be provided which is efficient for both short, narrow and long and wide burst lengths and which has interface circuitry with a relatively low pin count.

17 Claims, 5 Drawing Sheets

MEMORY CONTROLLER HAVING AN INTERFACE FOR PROVIDING A CONNECTION TO A PLURALITY OF MEMORY DEVICES

BACKGROUND OF THE INVENTION

1. Field of the Invention

This invention relates to memory controllers. More particularly, this invention relates to memory controllers for providing a connection to a plurality of memory devices.

2. Description of the Prior Art

A memory controller may be provided within a data processing apparatus to provide an interface between memory addressing components of the data processing apparatus, such as a central processing unit (CPU) or a co-processor, and an external memory device which is addressable by those components. A large number of input/output (I/O) pins are usually required to provide a suitable communications interface between the memory controller and the memory device. The input/output pins can be generally grouped into a data bus for communicating data signals, which represent information content to be stored or read, an address bus for communicating address signals, which represent the location within the memory device where the information content is stored or is to be stored, and a control bus for communicating control signals for controlling the read or write operation.

There is a general requirement to provide increased bandwidth for data transfer operations to and from memory devices, and a number of memory controller configurations have been contemplated in order to meet this requirement. One possibility is to widen the memory data bus to enable an increased number of data bits to be handled by the memory controller. Another possibility is to operate a number of memory controllers in parallel. However, the use of a single, wide memory controller is inefficient unless data is being transferred in long (i.e. wide) bursts, and the use of multiple narrow memory controllers increases the memory controller pin count substantially by requiring additional address and control signal lines.

SUMMARY OF THE INVENTION

Viewed from one aspect, the present invention provides a memory controller having an interface for providing a connection to a plurality of memory devices, at least one of said plurality of memory devices supporting burst mode data transfers, said memory controller comprising:

data interface circuitry coupled to a plurality of separate data buses to communicate data signals between said memory controller and a respective one of said memory devices, each of said data buses providing a dedicated data signal path to a different one of said memory devices;

address interface circuitry coupled to a common address bus to communicate address signals to each of said memory devices on a shared address signal path, address signals which are directed to different ones of said memory devices being time division multiplexed together on said common address bus; and device selecting circuitry coupled to one or more device selecting lines to communicate one or more device selecting signals synchronised with said time division multiplexing of said common address bus to select that memory device to which address signals currently asserted on said common address bus are directed.

In this way, an increased bandwidth memory controller can be provided which is efficient for both short and long burst lengths and which has interface circuitry with a relatively low pin count. The present technique recognises that memory devices which can be operated in a burst mode, whereby a single command provided on the address and control bus is used to transfer multiple items of data on subsequent clock edges, utilise the address and control bus less than the data bus. As a result, when a memory controller is to control the communication of data to and from a plurality of memory devices, a shared address bus can be used to communicate address signals to each of the memory devices by time division multiplexing address signals intended for different ones of the memory devices onto the shared address bus. The present technique avoids erroneous read and write operations by the unintended recipients of the address signals by applying device selecting signals synchronised with the time division multiplexing of the common address bus to the intended memory device. A memory device will therefore respond to applied address signals if they are received in combination with a device selecting signal.

While the plurality of memory devices may be formed as separate integrated circuits, they may also be formed such that multiple memory devices are part of a single integrated circuit, e.g. a system-on-chip integrated circuit.

1. While the memory controller may be a single memory controller providing a plurality of separate data buses, the memory controller could alternatively comprise a plurality of memory control units, each of which controls the communication of data signals on a respective one of the data buses, and each of which is operable to apply address and control signals to the shared address/control buses. In this case arbitration and control logic may be used to ensure that there aren't clashes on the common bus.

Embodiments of the present invention may be applicable to a wide range of memory devices, such as Flash memory, single data rate (SDR) memory, double data rate (DDR) memory and synchronous dynamic random access memory (SDRAM).

In addition to the provision of common address interface circuitry for providing a common address bus, the memory controller may also comprise common control interface circuitry for connecting to one or more common control signal lines for communicating control signals to each of said memory devices on a shared control signal path. In this case, control signals which are directed to different ones of said memory devices are time division multiplexed together on said common control signal lines in synchronisation with the time division multiplexing of the common address bus. In this way, the memory device selected by the device selecting circuitry reads the control signals currently being asserted on the common control signal lines in addition to the address signals currently being asserted on the common address bus.

However, while it may be possible for some control signal lines to be shared in common between the plural memory devices, other control signal lines may not be suited to a shared bus arrangement. In this case, dedicated control signal circuitry will be required to connect to a plurality of dedicated control signal lines for communicating controls signals to said memory devices, each of the dedicated control signal lines providing a dedicated control signal path to a respective one of the memory devices. For example, the common control signal lines may include a row address strobe line, a column address strobe line and a write enable line, and the dedicated control signal lines may include a clock enable line.

A memory controller may include one or more state machines which model the access availability of each of the memory devices. The one or more state machines have a state structure defined from predetermined characteristics of the memory device or devices being modelled. The state machine is used to track previous accesses to the memory devices, and to determine when access to the memory devices will be available based on the tracked previous accesses and its state structure. In this way, the address signals and device selecting signals can be generated in dependence on the determined availability of the memory devices.

In the present technique, the data interface circuitry may be operable concurrently to communicate data signals between the memory controller and the plurality of memory devices using the plurality of separate data buses. In this case, address signals corresponding to the concurrently communicated data signals are communicated successively to the respective memory devices over the time division multiplexed common address bus.

One or more of the memory devices can be formed as a plurality of separate physical memory devices sharing a device selecting signal, e.g. a plurality of banks of RAM cells connected to appear as a single logical memory.

Viewed from another aspect, the invention provides a memory controller having interface means for providing a connection to a plurality of memory devices, at least one of said plurality of memory devices supporting burst mode data transfers, said memory controller comprising means for connecting to a plurality of separate data buses for communicating data signals between said memory controller and a respective one of said memory devices, each of said data buses providing a dedicated data signal path to a different one of said memory devices;

means for connecting to a common address bus for communicating address signals to each of said memory devices on a shared address signal path, address signals which are directed to different ones of said memory devices being time division multiplexed together on said common address bus; and means for generating one or more device selecting signals synchronised with said time division multiplexing of said common address bus to select that memory device to which address signals currently asserted on said common address bus are directed.

Viewed from another aspect, the invention provides a method of controlling communication of data to a plurality of memory devices, at least one of said plurality of memory devices supporting burst mode data transfers, said method comprising the steps of:

communicating data signals over a plurality of separate data buses with a respective one of said memory devices, each of said data buses providing a dedicated data signal path to a different one of said memory devices;

time division multiplexing a plurality of address signals to be directed to different ones of said memory devices;

communicating said time division multiplexed address signals to each of said memory devices on a shared address signal path over a common address bus, and generating one or more device selecting signals synchronised with said time division multiplexing of said common address bus to select that memory device to which address signals currently asserted on said common address bus are directed.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
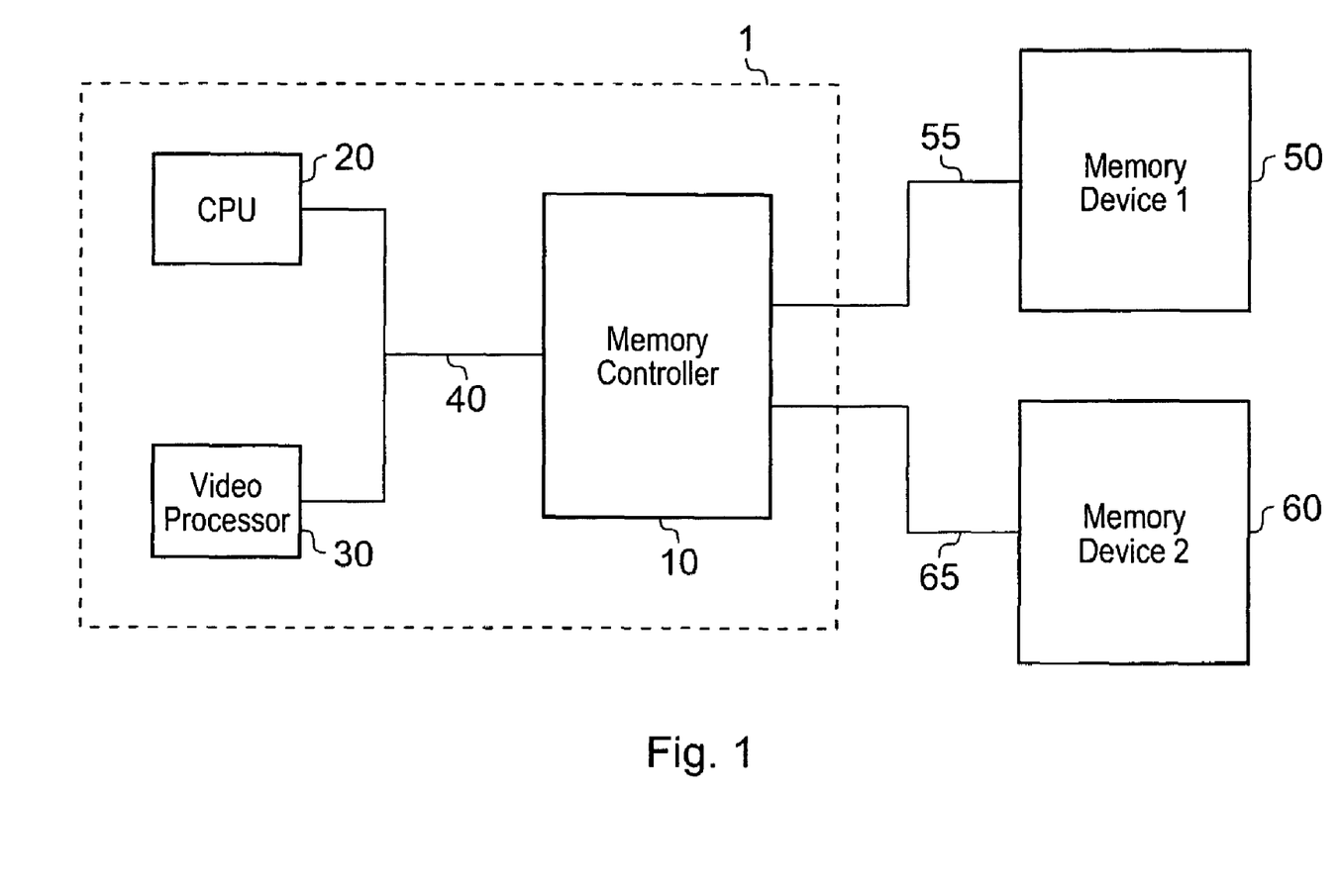
FIG. 1 schematically illustrates a data processing apparatus having a memory controller which provides a connection to two memory devices.

In FIG. 1, a data processing apparatus 1 includes a CPU 20, a video processor 30 and a memory controller 10 which are connected together by a bus 40. The CPU 20 and the video processor 30 are each operable to write data to or read data from an external memory device connected to the data processing apparatus 1. In particular, a first memory device 50 (memory device 1) is connected to the memory controller 10 via a bus 55, and a second memory device 60 (memory device 2) is connected to the memory controller 10 via a bus 65. The CPU 20 or the video processor 30 are each operable to read data from one or other (or both) of the memory devices 50, 60 by applying an address signal indicating the physical location of the desired data on a memory device to the memory controller 10 on the bus 40. The memory controller 10 is responsive to the applied address, control signal to provide address and control signals to the appropriate memory device to control a transfer of data from the memory device to the CPU 20 or the video processor 30 via the memory controller 10. The CPU 20 or the video processor 30 are each also operable to write data to one or other (or both) of the memory devices 50, 60 by applying onto the bus 40 an address signal and a data signal representing the data to be written. The memory controller 10 is responsive to the applied address and data signals to provide address, control and data signals to the appropriate memory device to store the data onto the memory device.

Figure 2:
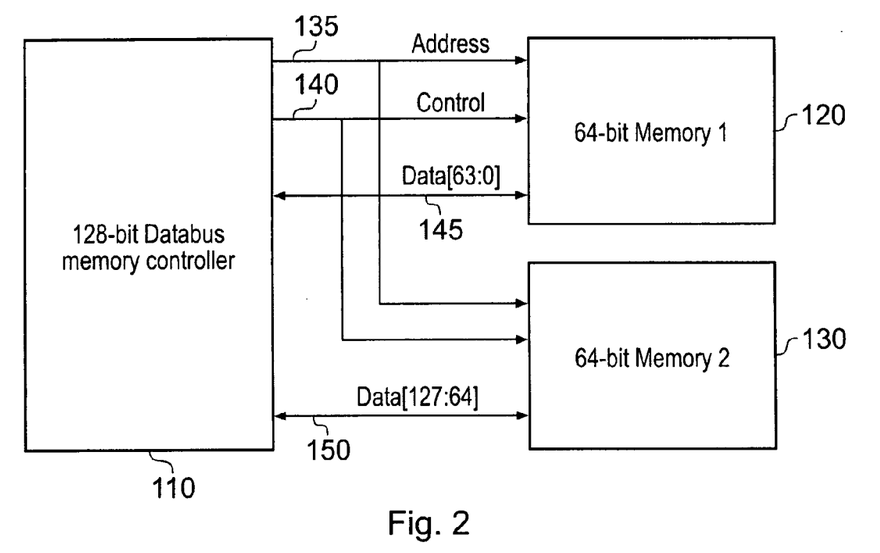
FIG. 2 schematically illustrates a first memory controller configuration for providing an increased data transfer bandwidth.

In FIG. 2, an example high-bandwidth memory controller is illustrated. The memory controller is a single wide 128-bit data bus memory controller which is operable to read and write data to and from a first 64-bit memory device 120 and a second 64-bit memory device 130. Each of the memory devices 120, 130 is connected to the memory controller 110 by a dedicated data bus. A common address bus 135 is used to apply the same address signals to both of the memory devices 120, 130 simultaneously. Likewise, a common control bus 140 is used to apply the same controls signals to both of the memory devices 120, 130 simultaneously. Each of the memory devices 120, 130 holds one half of the data corresponding to a particular memory address, and so both of the memory devices 120, 130 are accessible using the same memory addresses. The memory device 120 is connected to the memory controller 110 by a data bus 145 which is used to transfer the first 64 bits of data corresponding to a particular memory address, and the memory device 130 is connected to the memory controller 110 by a data bus 150 which is used to transfer the second 64 bits of data corresponding to the memory address. In this way, the two 64-bit memory devices can be accessed in parallel using respective dedicated 64-bit data buses to emulate a single 128-bit memory device being accessed on a 128-bit data bus. However, the wide memory controller illustrated in FIG. 2 is inefficient where short or narrow bursts of data are being stored or read.

Figure 3:
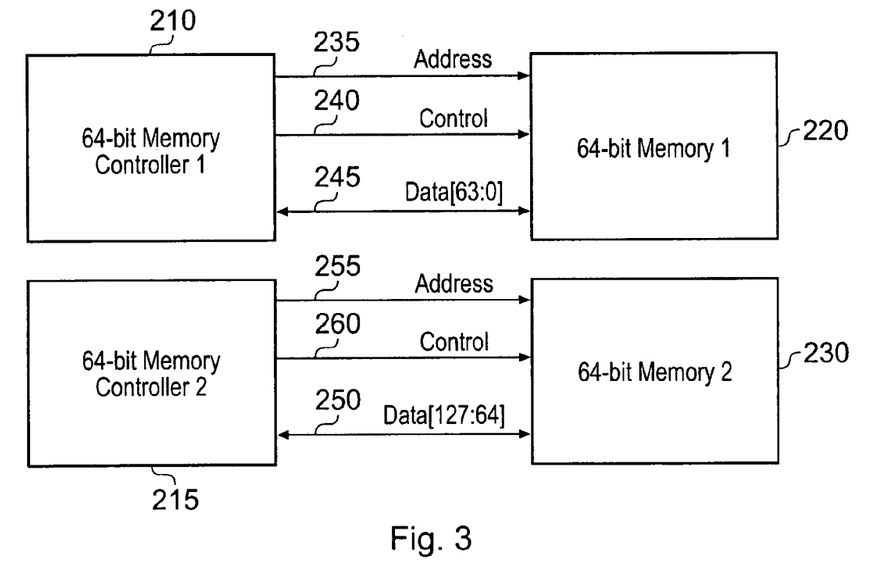
FIG. 3 schematically illustrates a second memory controller configuration for providing an increased data transfer bandwidth.

In FIG. 3, another example high-bandwidth memory controller configuration is illustrated, in this case using two 64-bit memory controllers in parallel. In particular, a first 64-bit memory controller 210 is provided which accesses a first 64-bit memory device 220, and a second 64-bit memory controller 215 is provided which accesses a second 64-bit memory device 230. The interface between the first memory controller 210 and the first memory device 220 is provided by a dedicated address bus 235, a dedicated control bus 240 and a dedicated data bus 245. The interface between the second memory controller 215 and the second memory device 230 is provided by a dedicated address bus 255, a dedicated control bus 260 and a dedicated data bus 250. It will therefore be appreciated that the first and second memory controllers provide separate interfaces to the first and second memory devices respectively. This configuration provides greater memory access efficiency than the memory controller of FIG. 2, because multiple accesses can be provided in parallel. Short and narrow transfers can be performed more efficiently using this scheme then the memory controller of FIG. 2. However, this configuration suffers from a high pin count due to the provision of separate address and control buses for the two memory controllers.

Figure 4:
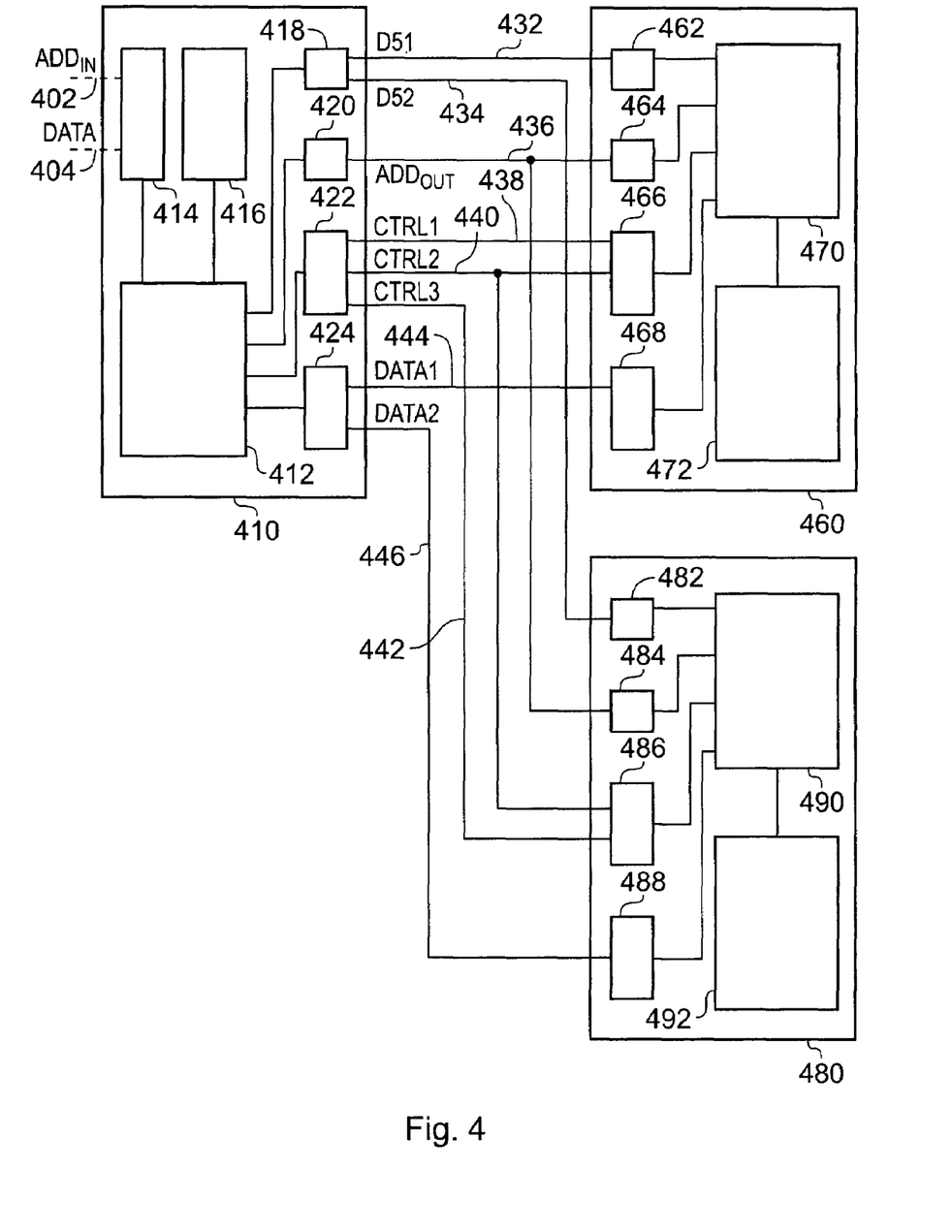
FIG. 4 schematically illustrates a memory controller in accordance with an example embodiment of the invention.

In FIG. 4, a high bandwidth memory controller 410 is illustrated which is operable to control the reading and writing of data to and from a first memory device 460 and a second memory device 480 (one or more of these memory devices can be provided in the form of a plurality of separate physical memory devices sharing a device selecting signal so as to act as a single logical memory device). The memory controller 410 comprises a control unit 412 for managing the operation of the memory controller 410. The memory controller 410 also comprises a buffer 414 for storing address signals $ADD_{IN}$ and data signals DATA received for example from a CPU on an address bus 402 and data bus 404 respectively. The buffer 414 also stores data signals obtained from the memory device 460 and the memory device 480 and transmits the obtained data signals to the CPU on the data bus 404.

The memory controller 410 comprises a state machine 416 which models the access availability the memory device 460 and the memory device 480. While the present example uses a single state machine to model both of the memory devices, it will of course be appreciated that separate state machines could be used to model the access availability of each of the memory device. The state machine has a state structure defined from predetermined characteristics of the memory devices 460, 480 such as the read and write access rates and response times. The state machine tracks previous accesses to the memory devices, and determines when access to the memory devices 460, 480 will next be available based on the tracked previous accesses and the state structure. In this way, the address signals, control signals, data signals and device selecting signals can be applied on the respective bus lines in dependence on the determined availability of the memory devices.

The memory controller 410 comprises interface circuitry for communicating signals to and from the memory devices 460, 480. In particular, the interface circuitry includes device selecting circuitry 418 for applying device selecting signals DS1, DS2 onto respective device select signal lines 432, 434 in order to select one or other of the memory devices 460, 480, address interface circuitry 420 for applying address signals $ADD_{OUT}$ onto a common address bus 436, control interface circuitry 422 for applying dedicated control signals CTRL1 onto one or more dedicated control signal lines 438 to the first memory device 460, dedicated control signals CTRL 3 onto one or more dedicated control signal lines 442 to the second memory device 480 and common control signals CTRL2 onto one or more common control signal lines 440 to both the first memory device 460 and the second memory device 480. The interface circuitry also includes data interface circuitry for applying dedicated data signals DATA1 onto a dedicated data bus 444 to be stored to the memory device 460, for applying dedicated data signals DATA2 onto a dedicated data bus 446 to be stored to the memory device 480, and also for reading data signals applied onto the dedicated data buses 444, 446 by the respective memory devices 460, 480.

The first and second memory devices 460, 480 also comprise interface circuitry, which is coupled to the interface circuitry of the memory controller 410 via the buses and signal lines 432, 434, 436, 438, 440, 442 and 444. In particular, the interface circuitry of the first memory device 460 comprises device selecting circuitry 462 for receiving device selecting signals DS1 on the device select signal line 432 and passing the received device selecting signals DS1 to a control unit 470. The interface circuitry of the first memory device 460 also comprises address interface circuitry 464 for receiving address signals $ADD_{OUT}$ on the common address bus 436 and passing the received address signals $ADD_{OUT}$ to the control unit 470, control interface circuitry 466 for receiving dedicated control signals CTRL1 on the dedicated control lines 438 and common control signals CTRL2 on the common control lines 440 and passing the received control signals to the control unit 470, and data interface circuitry 468 for receiving data signals DATA1 on the dedicated data bus 444 and passing the received data signals to the control unit 470. The control unit 470 is responsive to a particular combination of device selecting signals DS1, address signals $ADD_{OUT}$, control signals CTRL1, CTRL2 and data signals DATA1 to store data to a predetermined location in an array of memory cells 472 provided on the memory device 460. The control unit 470 is also responsive to a particular combination of device selecting signals DS1, address signals $ADD_{OUT}$ and control signals CTRL1, CTRL2 to read data from a predetermined location in the array of memory cells 472. The data is sent to the interface circuitry 468 then on to the dedicated bus 444 to the memory controller.

The interface circuitry of the second memory device 480 comprises device selecting circuitry 482 for receiving device selecting signals DS2 on the device select signal line 434 and passing the received device selecting signals DS2 to a control unit 490. The interface circuitry of the first memory device 480 also comprises address interface circuitry 484 for receiving address signals $ADD_{OUT}$ on the common address bus 436 and passing the received address signals $ADD_{OUT}$ to the control unit 490, control interface circuitry 486 for receiving dedicated control signals CTRL3 on the dedicated control lines 438 and common control signals CTRL2 on the common control lines 440 and passing the receiving control signals to the control unit 490, and data interface circuitry 488 for receiving data signals DATA2 on the dedicated data bus 446 and passing the received data signals to the control unit 490. The control unit 490 is responsive to a particular combination of device selecting signals DS2, address signals $ADD_{OUT}$, control signals CTRL2, CTRL3 and data signals DATA2 to store data to a predetermined location in an array of memory cells 492 provided on the memory device 480. The control unit 490 is also responsive to a particular combination of device selecting signals DS2, address signals $ADD_{OUT}$ and control signals CTRL2, CTRL3 to read data from a predetermined location in the array of memory cells 492. The data is sent to the interface circuitry 468 then on to the dedicated bus 444 to the memory controller.

Figure 5:
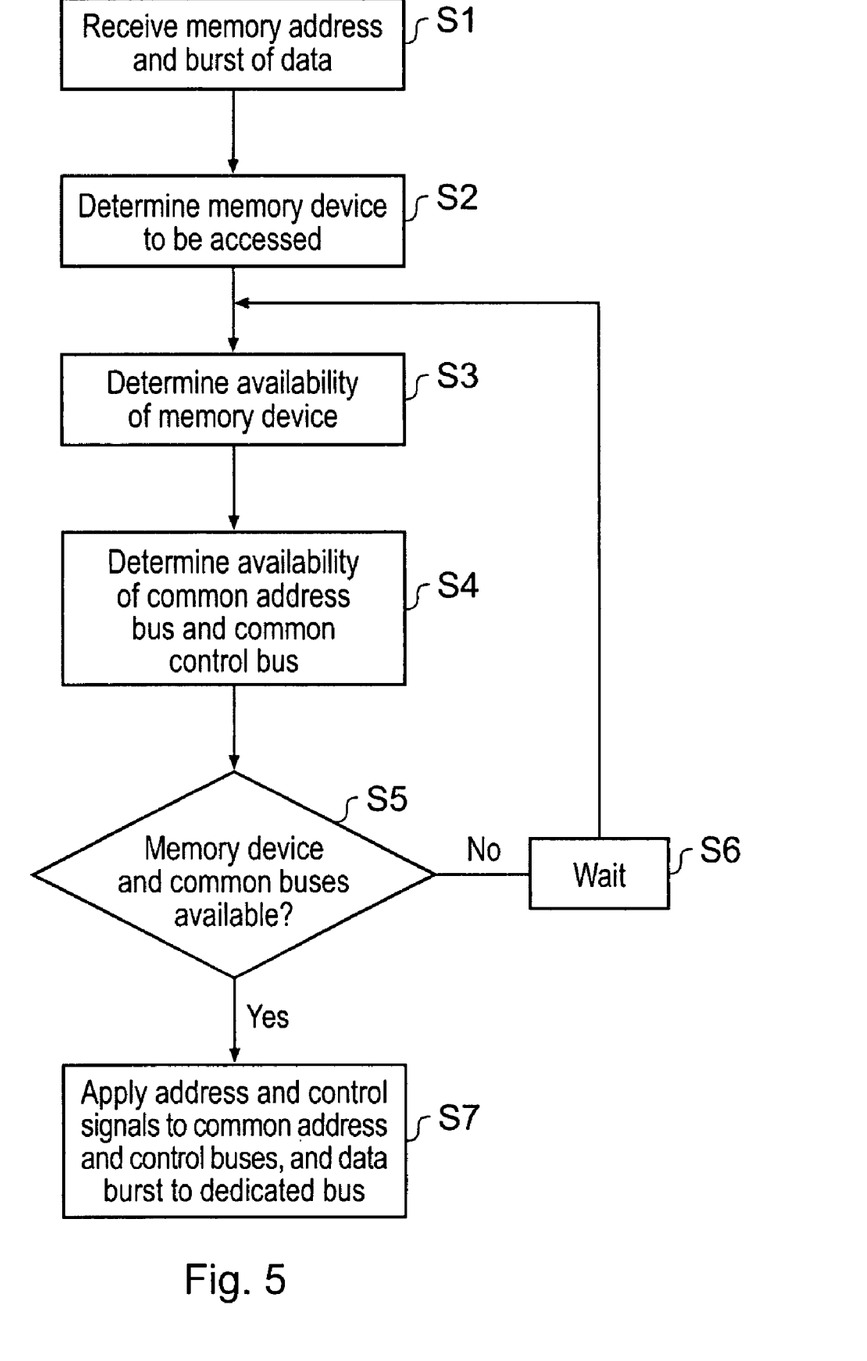
FIG. 5 is a schematic flow diagram illustrating a method of controlling the communication of data to or from a plurality of memory devices according to an example embodiment of the invention.

An example operation of the memory controller 410 and the memory devices 460, 480 of FIG. 4 will now be described with respect to the schematic flow diagram of FIG. 5. The example operation relates to a write operation in which data is written to one of the memory devices 460, 480. At a step S1, the memory controller 410 receives a memory address $ADD_{IN}$ on an address bus 402, and a burst of data DATA on a data bus 404, both of which are stored in the buffer 414. The memory address $ADD_{IN}$ specifies the first of a series of memory locations to which the burst of data is to be stored on one or other (or both) of the memory devices 460, 480. Then, at a step S2, the control unit 412 determines, based on the address signal $ADD_{IN}$, which of the memory devices 460, 480 is to be accessed in order to store the data. The control unit 412 is able to determine the appropriate memory device because the mapping between memory addresses and memory cells on each of the memory devices 460, 480 is known to the memory controller 410 in advance.

At a step S3, the control unit 412 determines, by referring to the state machine 416, when the memory device determined in the step S2 will next be available for write access. The control unit 412 at a step S4, determines, based on a knowledge of current and planned accesses to the memory devices, when the common address bus 436 and the common control bus 440 will be available. This availability relies on the fact that when bursts of data are being stored to or read from a memory device, the common address bus 436 and the common control bus 440 will only be utilised for a portion of the time taken for a burst of data to be transferred to or from the memory device on a data bus. Accordingly, even when a data transfer operation is in progress, the common address and control buses may be available for use in initiating a parallel data transfer operation on the other data bus. At a step S5, if the determined memory device and the common buses are not available, processing waits at a step S6, and then the steps S3 to S5 are repeated until the determined memory device and the common buses are available, in which case processing moves on to a step S7, where the write operation is conducted by applying appropriate address and control signals to the address and control buses, and by applying the data burst to the dedicated bus. While in the present example a burst of data is stored to one memory device, it will be appreciated that the burst of data may be split between the two memory devices, in which case the step S2 will result in the determination of different memory devices for different portions of the burst of data, and the steps S3 to S7 will be applied separately in respect of these different portions.

While the above example describes a write operation, a similar process can be used to effect a read operation. In particular, the step S1 would then be modified to receive a memory address and a burst length, and the step S7 would be modified to receive rather than apply the burst of data on the dedicated data bus.

Figure 6A:
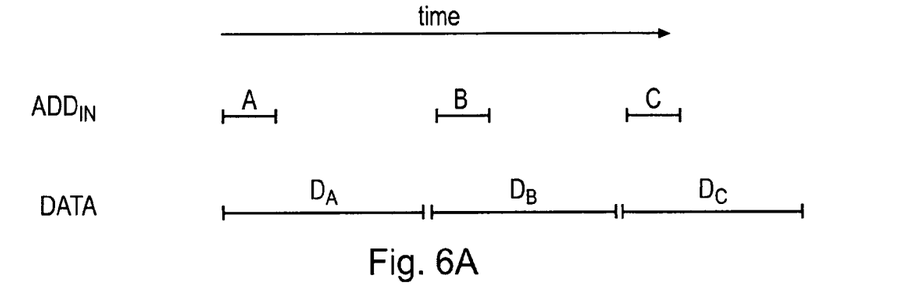
FIGS. 6A and 6B schematically illustrate example signal timings for a plurality of data transfer operations using the memory controller of FIG. 4.
Figure 6B:
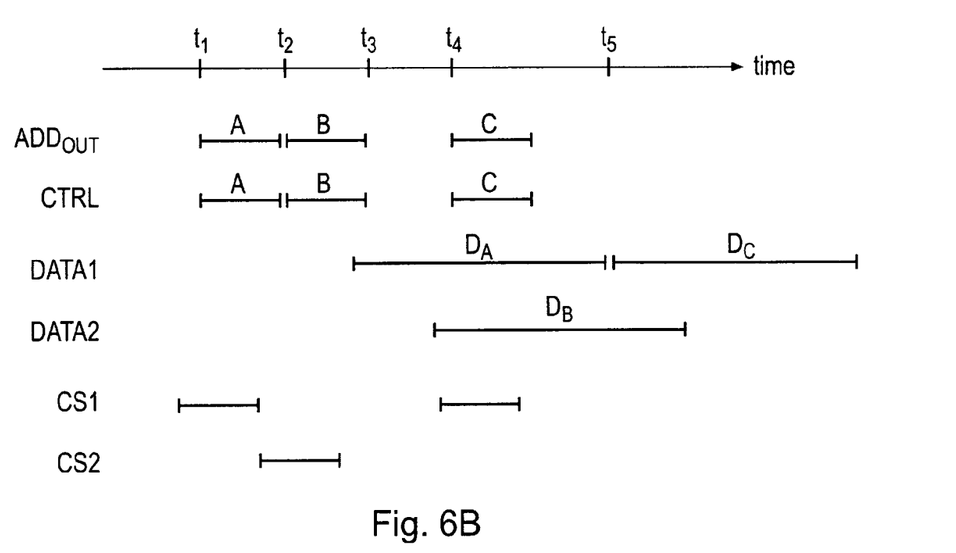

Referring to FIGS. 6A and 6B, timing diagrams for an example series of data transfer operations are schematically illustrated in which bursts of data are received by the memory controller 410 and then stored into the memory devices 460, 480. In particular, FIG. 6A schematically illustrates address signals $ADD_{IN}$ and data signals DATA being received on the address bus 402 and data bus 404 as a function of time. Three bursts of data $D_A$, $D_B$ and $D_C$ are received, along with corresponding address data A, B and C. It can be seen that the bursts of data are received sequentially. This sequential operation is not problematic because the data bus 404 between the CPU and the memory controller 410 is very fast, and so the transfer of data shown in FIG. 6A can occur much more quickly than the rate at which data can be stored into an external memory device.

In FIG. 6B, the transfer of the bursts of data $D_A$, $D_B$ and $D_C$ from the memory controller 410 to the memory devices 460, 480 is schematically illustrated as a function of time. In particular, data signals DATA1 are transferred from the memory controller 410 to the memory device 460 on the dedicated data bus 444, and data signals DATA2 are transferred from the memory controller 410 to the memory device 480 on the dedicated data bus 446. In this way, data can be transferred in parallel to the two memory devices 460, 480. FIG. 6B illustrates signals being applied onto address, control, data and device selecting buses and lines as a function of time, however, neither FIG. 6A or FIG. 6B are shown to scale, and the time periods required for data transfer in FIG. 6B are likely to be substantially greater than the time periods required for data transfer in FIG. 6A.

The first burst of data to be transferred from the memory controller 410 to one of the memory devices is burst $D_A$. The initiation of the transfer of burst $D_A$ is achieved by applying the corresponding address signals $ADD_{OUT}$ onto the common address bus 436 and the appropriate control signals CTRL2 onto the control signal lines 438, 440 at a time $t_1$. In consequence, a short time later at a time $t_3$ the data burst $D_A$ will be applied to the dedicated data bus 444 and thereby stored to the memory device 460. As a result of the address and control signals being applied to buses which are shared between both memory controllers, it is necessary to specify which of the memory controllers should act on the memory and control signals. Accordingly, at the time $t_1$ a device select signal CS1 is applied on the device select line 432 in order to select the memory device 460. As a result, the memory controller 460 will act on the received address and control signals, whereas the memory controller 480, in the absence of a device select signal, will ignore the received address and control signals.

While the data burst $D_A$ is being transferred on the dedicated data bus 444, the dedicated data bus 446 is still available. Additionally, the address and control buses are only utilised for a short period in order to set up the data burst $D_A$, and so can quickly be used to set up another data burst. Accordingly, after the address and control signals have been applied in respect of the data burst $D_A$, address and control signals are applied to the address and control buses at a time $t_2$ in respect of a second data burst $D_B$. Meanwhile at the time $t_2$, a device select signal CS2 is applied to the device select line 434 in order to select the memory device 480. In consequence, a short time later at a time $t_4$, the data burst $D_B$ will be applied to the dedicated data bus 446 and thereby stored to the memory device 480. As can be seen from FIG. 6B, storage of both the data burst $D_A$ and the data burst $D_B$ is therefore conducted concurrently. The transfer of the burst $D_A$ terminates at a time $t_5$, and so the data bus 444 becomes available at that time. Accordingly, ahead of the time $t_5$, at a time $t_4$, address, control and device select signals are applied to initiate the transfer of data burst $D_C$ at the time $t_5$, causing the transfer of burst $D_C$ to occur concurrently with the transfer of burst $D_B$.

The timing diagram of FIG. 6B assumes that bursts $D_A$ and $D_C$ are intended for storage in the memory device 460 and that burst $D_B$ is intended for storage in the memory device 480. The concurrent transfer arrangement of FIG. 6B will of course not be possible if all of the data bursts are intended for storage in the same memory controller. Accordingly, the memory address mapping scheme used to allocate memory addresses to the respective memory devices is important to achieve efficiency of operation. For instance, if the data processing system executes a number of parallel processing threads, for example separate processing a CPU and a video processor, then the separate memory devices could be allocated to separate regions of memory, enabling the separate regions of memory to be separately and concurrently accessed by the memory controller using separate dedicated data buses. Alternatively, if concurrent operation of multiple processing devices is unlikely and large amounts of data are likely to be streamed to and from memory by a single processing device, then low order bits of memory addresses could be interleaved between the memory devices, emulating a single high-bandwidth data bus. It will be appreciated that the address mapping scheme could be set either in hardware or in software. If the address mapping scheme is set in software then the software programmer is responsible for ensuring that the correct address mapping scheme is chosen for any given task.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A memory controller having an interface for providing a connection to a plurality of memory devices, at least one of said plurality of memory devices supporting burst mode data transfers, said memory controller comprising
data interface circuitry coupled to a plurality of separate data buses to communicate data signals between said memory controller and a respective one of said memory devices, each of said data buses providing a dedicated data signal path to a different one of said memory devices;
address interface circuitry coupled to a common address bus to communicate address signals to each of said memory devices on a shared address signal path, address signals which are directed to different ones of said memory devices being time division multiplexed together on said common address bus; and
device selecting circuitry coupled to one or more device selecting lines to communicate one or more device selecting signals synchronised with said time division multiplexing of said common address bus to select that memory device to which address signals currently asserted on said common address bus are directed, wherein said memory controller is arranged to sequentially receive a plurality of burst of data, and said data interface circuitry is arranged to concurrently communicate data signals of different ones of said plurality of bursts of data from said memory controller to said plurality of memory devices using said plurality of separate data buses, address signals corresponding to concurrently communicated data signals are communicated successively to said respective memory devices over said time division multiplexed common address bus.

2. A memory controller as claimed in claim 1, comprising common control interface circuitry coupled to one or more common control signal lines to communicate control signals to each of said memory devices on a shared control signal path, control signals which are directed to different ones of said memory devices being time division multiplexed together on said common control signal lines in synchronisation with said time division multiplexing of said common address bus; wherein said selected memory device reads said control signals currently being asserted on said common control signal lines.

3. A memory controller as claimed in claim 1, comprising dedicated control signal circuitry coupled to a plurality of dedicated control signal lines to communicate controls signals to said memory devices, each of said dedicated control signal lines providing a dedicated control signal path to a respective one of said memory devices.

4. A memory controller as claimed in claim 1, comprising at least one state machines having states modelling access availability of respective memory devices, each of said at least one state machine having a state structure defined from predetermined characteristics of a respective memory device and configured:
to track previous accesses to said respective memory device; and
to determine when access to said respective memory device will be available based on said tracked previous accesses and said state structure of said at least one state machine.

5. A memory controller as claimed in claim 4, wherein said address signals and device selecting signals are generated in dependence on said determined availability of said memory devices.

6. A memory controller as claimed in claim 1, comprising a state machine having states modelling access availability of a plurality of memory devices, the state machine having a state structure defined from predetermined characteristics of the plurality of memory devices and configured:
to track previous accesses to each of said plurality of memory devices; and
to determine when access to each of said plurality of memory devices will be available based on said tracked previous accesses and said state structure of said state machine.

7. A memory controller as claimed in claim 1, wherein at least one of said memory devices comprises a plurality of separate physical memory devices sharing a device selecting signal.

8. A memory controller as claimed in claim 1, wherein each of the memory devices has an array of memory cells for storing data, and wherein the device selecting circuitry selects one of said memory devices based upon the address signals currently asserted in accordance with a predetermined mapping between memory addresses and memory cells of said plurality of memory devices.

9. A memory controller having interface means for providing a connection to a plurality of memory devices, at least one of said plurality of memory devices supporting burst mode data transfers, said memory controller comprising
means for connecting to a plurality of separate data buses for communicating data signals between said memory controller and a respective one of said memory devices, each of said data buses providing a dedicated data signal path to a different one of said memory devices;
means for connecting to a common address bus for communicating address signals to each of said memory devices on a shared address signal path, address signals which are directed to different ones of said memory devices being time division multiplexed together on said common address bus; and means for generating one or more device selecting signals synchronised with said time division multiplexing of said common address bus to select that memory device to which address signals currently asserted on said common address bus are directed, wherein said memory controller is arranged to sequentially receive a plurality of burst of data, and said means for connecting is arranged to concurrently communicate data signals of different ones of said plurality of bursts of data from said memory controller to said plurality of memory devices using said plurality of separate data buses, address signals corresponding to concurrently communicated data signals are communicated successively to said respective memory devices over said time division multiplexed common address bus.

10. A method of controlling communication of data to a plurality of memory devices, at least one of said plurality of memory devices supporting burst mode data transfers, said method comprising the steps of:

sequentially receiving a plurality of bursts of data;

communicating data signals over a plurality of separate data buses with a respective one of said memory devices, each of said data buses providing a dedicated data signal path to a different one of said memory devices;

time division multiplexing a plurality of address signals to be directed to different ones of said memory devices;

communicating said time division multiplexed address signals to each of said memory devices on a shared address signal path over a common address bus, generating one or more device selecting signals synchronised with said time division multiplexing of said common address bus to select that memory device to which address signals currently asserted on said common address bus are directed; and concurrently communicating data signals of different ones of said plurality of bursts of data from said memory controller to said plurality of memory devices using said plurality of separate data buses, address signals corresponding to concurrently communicated data signals are communicated successively to said respective memory devices over said time division multiplexed common address bus.

11. A method of controlling communication of data as claimed in claim 10, comprising the step of time division multiplexing a plurality of control signals to be directed to different ones of said memory devices;

communicating said time division multiplexed control signals to each of said memory devices on a shared control signal path over one or more common control signal lines, wherein control signals which are directed to different ones of said memory devices are time division multiplexed together on said common control signal lines in synchronisation with said time division multiplexing of said common address bus; and said selected memory device reads said control signals currently being asserted on said common control signal lines.

12. A method of controlling communication of data as claimed in claim 10, comprising the step of communicating controls signals to said memory devices on a plurality of dedicated control signal lines which provide a dedicated control signal path to a respective one of said memory devices.

13. A method of controlling communication of data as claimed in claim 10, comprising the steps of:

modelling access availability of respective memory devices using at least one state machines each of said at least one state machine having a state structure defined from predetermined characteristics of a respective memory device;

tracking previous accesses to said respective memory device; and determining when access to said respective memory device will be available based on said tracked previous accesses and said state structure of said at least one state machine.

14. A method of controlling communication of data as claimed in claim 13, comprising the step of:

generating said address signals and device selecting signals in dependence on said determined availability of said memory devices.

15. A method of controlling communication of data as claimed in claim 10, comprising:

modelling access availability of a plurality of memory devices using a state machine having a state structure defined from predetermined characteristics of the plurality of memory devices;

tracking previous accesses to each of said plurality of memory devices; and determining when access to each of said plurality of memory devices will be available based on said tracked previous accesses and said state structure of said state machine.

16. A method of controlling communication of data as claimed in claim 10, comprising the step of concurrently communicating data signals between said memory controller and said plurality of memory devices using said plurality of separate data buses, address signals corresponding to concurrently communicated data signals being communicated successively to said respective memory devices over said time division multiplexed common address bus.

17. A method as claimed in claim 10, wherein at least one of said memory devices comprises a plurality of separate physical memory devices sharing a device selecting signal.

* * * * *

UNITED STATES PATENT AND TRADEMARK OFFICE
CERTIFICATE OF CORRECTION

| | | |
|---|---|---|
| PATENT NO. | : 7,694,099 B2 | Page 1 of 1 |
| APPLICATION NO. | : 11/653429 | |
| DATED | : April 6, 2010 | |
| INVENTOR(S) | : Croxford | |

It is certified that error appears in the above-identified patent and that said Letters Patent is hereby corrected as shown below:

Title page, the following should be inserted as a new item:

Item --(73) Assignee: ARM Limited, Cambridge (GB)--

Signed and Sealed this
Seventeenth Day of May, 2011

David J. Kappos
*Director of the United States Patent and Trademark Office*